United States Patent [19]

Davis

[11] Patent Number: 4,828,850
[45] Date of Patent: May 9, 1989

[54] BEVERAGE BAG ASSEMBLY WITH SUPPORTING FRAMEWORK AND VENTED CAP AND STORAGE CHAMBER

[76] Inventor: David Davis, 3010 Powder Mill Cir., Bethlehem, Pa. 18017

[21] Appl. No.: 138,717

[22] Filed: Dec. 28, 1987

[51] Int. Cl.$^4$ ............................ A23F 5/26; B65B 29/02
[52] U.S. Cl. ....................................... 426/77; 53/469; 99/323; 206/0.5; 426/82; 426/110; 426/115; 426/394; 426/396
[58] Field of Search ................... 426/77, 82, 110, 112, 426/115, 394, 396; 99/295, 323; 206/0.5; 383/12, 18, 19, 26; 53/469, 471, 473

[56] References Cited

U.S. PATENT DOCUMENTS

| | | | |
|---|---|---|---|
| Re. 21,338 | 1/1940 | Haut | 426/82 |
| 785,659 | 3/1905 | Brown | 426/77 |
| 2,133,166 | 10/1938 | Fritsche | 426/82 |
| 3,154,418 | 10/1964 | Lovell et al. | 426/82 |
| 3,354,812 | 11/1967 | Gorton, Jr. | 99/323 |
| 4,215,628 | 8/1980 | Dodd, Jr. | 99/323 |
| 4,338,338 | 7/1982 | Popkes | 426/82 |
| 4,465,697 | 8/1984 | Brice et al. | 426/79 |

FOREIGN PATENT DOCUMENTS 1436397 5/1976 United Kingdom ................. 426/77

Primary Examiner—George Yeung
Attorney, Agent, or Firm—Steele, Gould & Fried

[57] ABSTRACT

A beverage bag assembly includes a supporting framework, a vented cap, a flotation ring, and, preferably, a storage chamber. A water permeable bag with an open top is supported by the framework, attached to the flotation ring, and capped, all the elements joined by a securing band. When the bag is filled with a dry beverage substance, it is suspended and immersed in water and held there by the flotation of the flotation ring. The cap and storage chamber include gas escape vents and removable vent tabs.

17 Claims, 3 Drawing Sheets

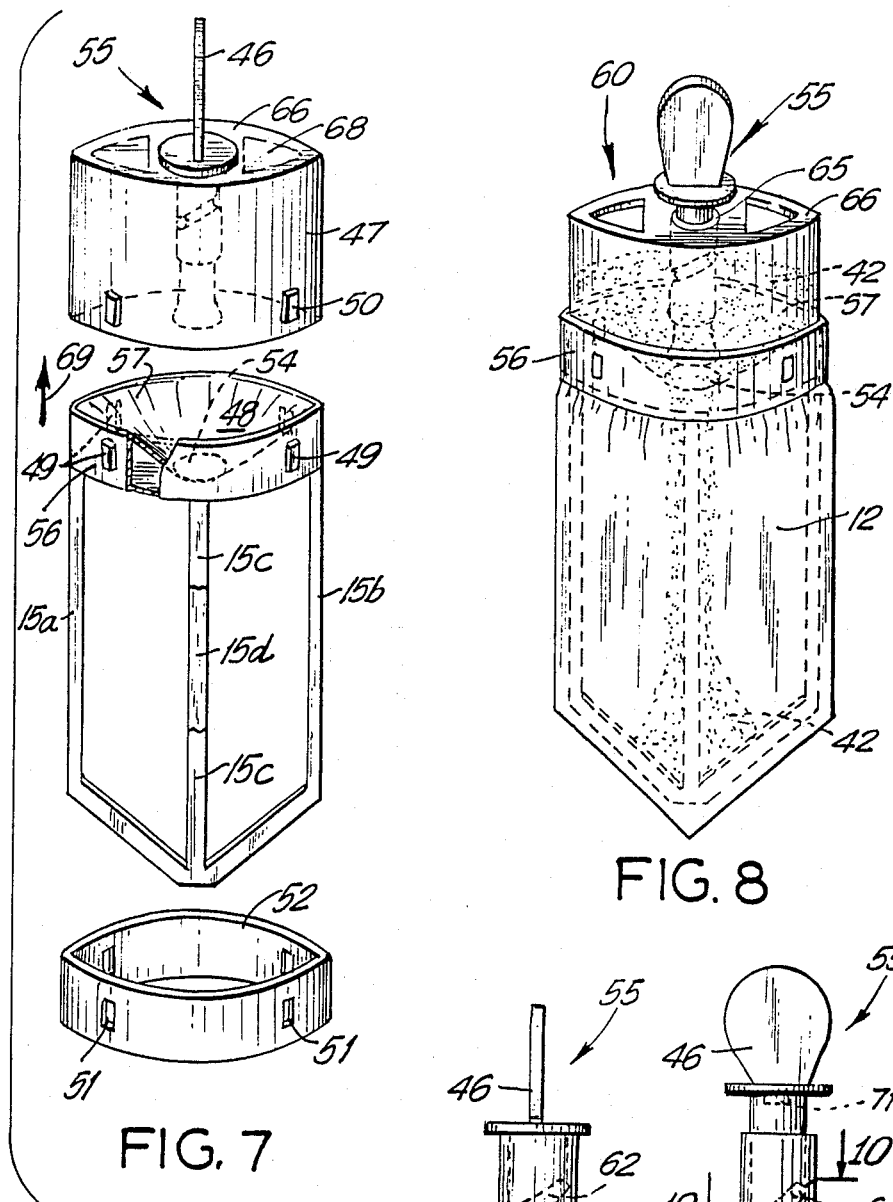
FIG. 7
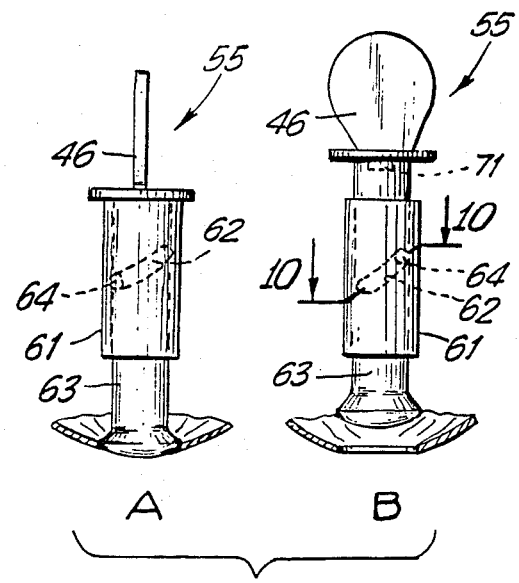
FIG. 8
FIG. 9
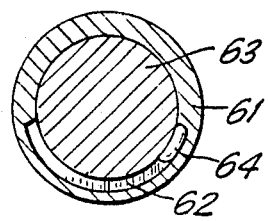
FIG. 10

BEVERAGE BAG ASSEMBLY WITH SUPPORTING FRAMEWORK AND VENTED CAP AND STORAGE CHAMBER

BACKGROUND OF THE INVENTION

1. Field of the Invention

This invention relates to beverage apparatus and, more particularly, to infusers.

2. Description of the Prior Art

There are many beverage infusers on the market. Among these are some which use bags to contain a dry beverage substance, such as ground coffee (an example of which is the Epicure Shop coffee bags) or the common tea bags containing tea leaves.

It is known that better brewing is achieved if water moves through the infuser during the brewing process. This is most simply accomplished, for example, by manually dipping the tea bags. Other infusers provide motion to the brewing process by stirring. To this end, many infusers are generally spoon-shaped and comprise a perforated container to hold the substance and a handle for stirring the beverage. Among these are U.S. Pat. Nos. Re 21,338 to Haut; 3,154,418 to Lovell et al; 3,354,812 to Gorton, Jr.; and 4,338,338 to Popkes.

Dodd, Jr. (U.S. Pat. No. 4,215,628) and Fritsche (U.S. Pat. No. 2,133,166) disclose infusion and stirring devices which include porous bags held inside a handle. The handle acts as an exterior framework to hold the bag for stirring purposes.

As water moves through the infusers, or as water boils, gases are produced which cause the beverage bags to float on the top of the water and expose less of the beverage substance to the action of the water. This can be overcome by the user constantly stirring the device, or by providing gas escape means, such as provided in the baffles and handle of U.S. Pat. No. 4,465,697 to Brice.

When hot drinks are made in a microwave oven, the beverage bag usually floats to the top and does not receive the desirable action of water molecules travelling through it. It thus must steep for several minutes for sufficient taste to develop. Therefore, it is especially important in the age of the microwave oven to have a beverage bag which brews a cup of cofee quickly. Such a beverage bag should have supports and a flotation structure which causes it to remain completely immersed in the cup. It should also provide for the escape of gases from the bag. It should also offer a sealed storage chamber which holds the beverage substance until use to insure freshness in a chamber which does not allow chemical reactions between the bag material and the beverage substance during storage is desirable.

There is no known beverage bag assembly with a supporting device which incorporates a flotation ring and gas escape vents in the cap or storage chamber, is easily assembled, is disposable and is particularly adaptable for use in a microwave oven.

SUMMARY OF THE DISCLOSURE

The aforementioned prior art problems are obviated by the beverage bag assembly with supporting device, vented cap, and storage chamber of this invention. In one embodiment, a water permeable, preferably paper, bag is formed with preferably heat sealed sides and an open top. To assemble, a framework of upright supports joined by cross members is inserted into the bag A vented top cap of a size to span and seal the open top of the bag is preferably snap fitted to the end of the upright supports. A generally ovaloid securing band is fastened around the cap and upright supports and is preferably snap fitted with the cap. Coffee granules (or other dry beverage substances) may be poured into the bag through the gas vents. The vents are then covered with removable tabs to prevent spillage.

In the preferred embodiment of the assembly for use in the microwave, a flotation ring is fastened either inside or outside the vented cap or storage chamber. The flotation ring is preferably a generally hollow toroid which may be placed at any point along the height of the cap or storage chamber. Because the flotation ring is located at the top of the bag and floats on the surface, the entire bag beneath is suspended in the water. Thus, the beverage bag with supports is entirely and constantly immersed in the water for complete brewing. Also, the problem of the bag filling with gases in the microwave oven is solved by escape of gases through the gas vents in the cap or storage chamber top.

Additionally, in the preferred embodiment, the coffee granules are stored in a storage chamber and released into the bag only when a handle assembly breaks preformed seals. Thus the stored granules remain fresh and uncontaminated until use.

It is, therefore, an object of this invention to provide an inexpensive beverage bag assembly which quickly makes an individual (or larger) serving of a beverage and is then disposable.

It is another object of this invention to provide a beverage bag assembly with gas escape vents which floats in a cup for use with brewed or infused substances such as hot coffee or hot tea.

It is yet another object of this invention to provide a beverage bag assembly which is especially useful for making an individual cup of coffee in a microwave oven.

It is still another object of this invention to provide a beverage bag with support and gas vents which is simple to assemble.

It is a further object of this invention to provide a beverage bag assembly with support and gas escape vents which allows the infusion process to take place while the water is being heated in a microwave oven, rather than after the water has been heated.

It is yet a further object of this invention to provide a beverage bag assembly with gas escape vents in which the vents are covered with a removable tab, either manually operated or mechanically operated.

It is still a further object of this invention to provide a beverage bag assembly which may be sealed inside a stay-fresh pouch.

It is another object of this invention to provide a beverage bag assembly in which the beverage substance is sealed in a storage chamber and released into the bag immediately before brewing, thereby preserving freshness and adding shelf life to the product.

These and other objects will be more readily ascertainable to one skilled in the art from a consideration of the following Figures, description and exemplary embodiments.

BRIEF DESCRIPTION OF THE DRAWING(S)

FIG. 7 is an exploded view of the preferred embodiment of the bag assembly without a bag and including a storage chamber and a the flotation ring with attached supports mounted inside the securing band.

FIG. 8 is an illustration of the assembled and filled beverage bag assembly of FIG. 7 in the open position with a dry beverage substance being released into the bag.

FIG. 9 illustrates the handle assembly in both the open and the closed positions with cut away areas to show the knob riding in the groove.

FIG. 10 is a cross section of the stem of the handle assembly taken on lines 10—10 of FIG. 9.

DETAILED DESCRIPTION OF THE PREFERRED EMBODIMENT(S)

Figure 1:
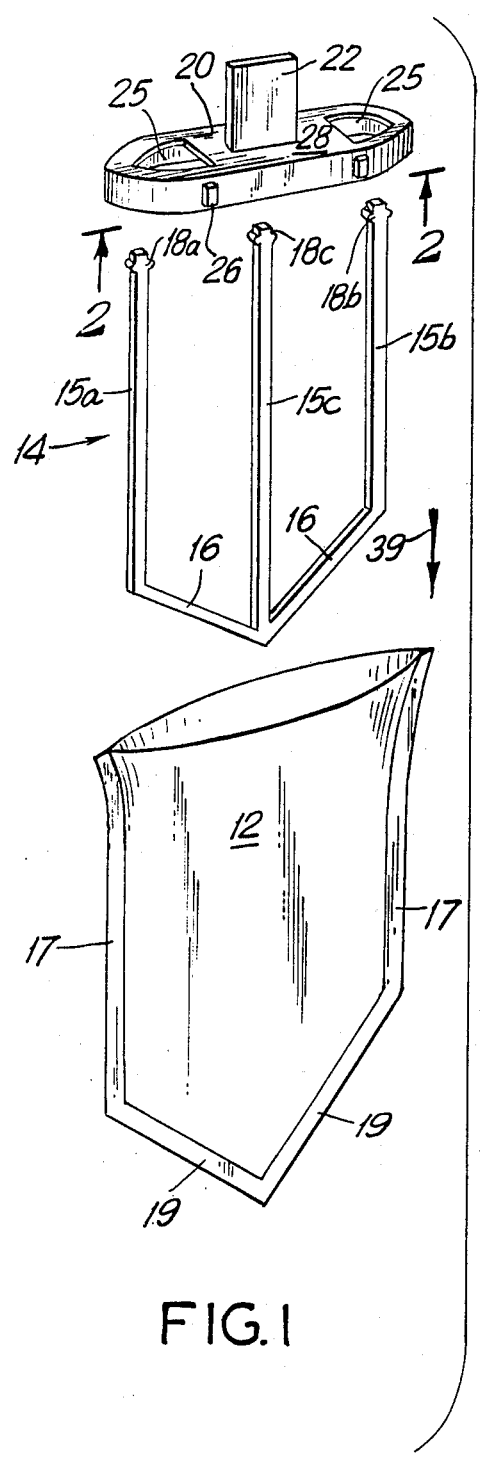
FIG. 1 is an exploded view of an assembly of the beverage bag, the frame, and the vented cap.
Figure 2:
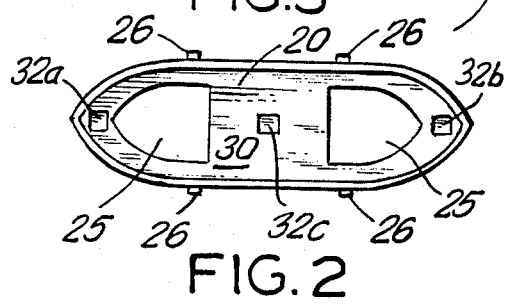
FIG. 2 is a bottom view of the cap of FIG. 1 taken on lines 2—2 of FIG. 1.

Referring now to the drawings, and more particularly to FIGS. 1 and 2, an elongated bag 12 is seen with heat sealed sides 17 and bottom 19. Framework 14 is seen with upright members 15a, 15b and 15c, and cross members 16. Cap 20 is seen with handle 22, vents 25 on top 28 of cap 20, and detents 26. Seen on underside 30 of cap 20 are indents 32a, 32b and 32c. Vents 25 allow gases to escape bag 12 during steeping. For storage, vents 25 may be covered with removable tabs 24 (seen in FIGS. 4 and 5). Also seen on cap 20 is optional handle 22. Although handle 22 is seen here as a simple fingertip graspable bar, it may be shaped differently, for instance as a hook or knob.

Beverage bag assembly 10 (seen completely assembled in FIG. 4) is easily assembled by first inserting framework 14 into bag 12 in the direction of arrow 39 with cross members 16 at bag bottom 19 and uprights 15a and 15c at bag sides 17. Upright support members 15a, 15b and 15c have tops 18a, 18b and 18c, respectively, which are preferably snap fitted to cap 20 in indents 32a, 32b and 32c, respectively. When bag 12 and framework 14 have been snap fitted to cap 20, the device 33, as illustrated in FIG. 3, is produced.

Figure 3:
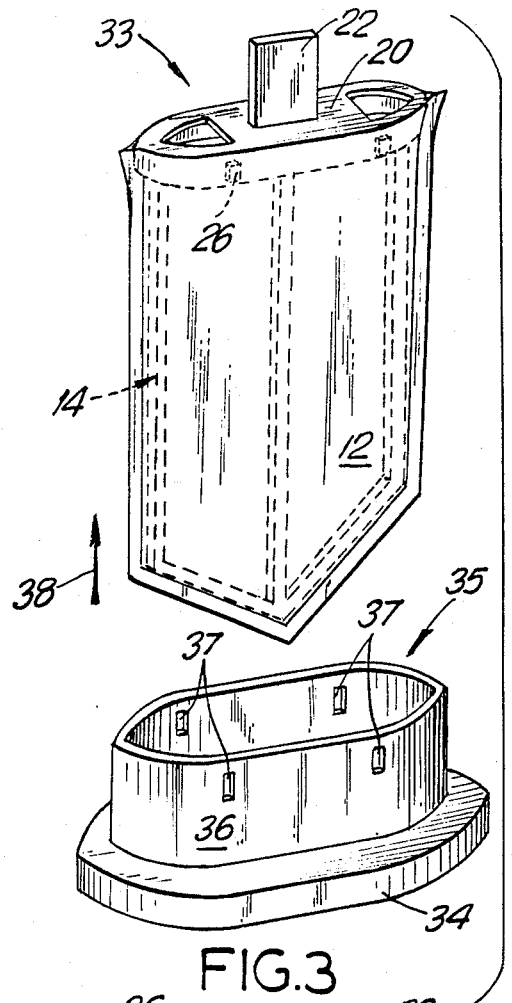
FIG. 3 is an exploded view of the assembled bag and supporting frame and cap, and the combined flotation ring and securing band.

Now referring to FIG. 3, partially assembled device 33 is illustrated exploded from combined securing band/flotation ring 35. Combined band/ring 35 is illustrated herein as unitary, but it also may be formed of separate units fitted together. Securing band 36 is seen with apertures 37 which receive detents 26 on cap 20. Flotation ring 34 is seen attached to the bottom outside of band 36, but it may be positioned at any point on the height of band 36. Securing band 36 is slipped over bag 12 of partially assembled device 33 in the direction of arrow 38 until detents 26 snap into apertures 37, producing the complete assembled device as illustrated in FIG. 4.

Figure 4:
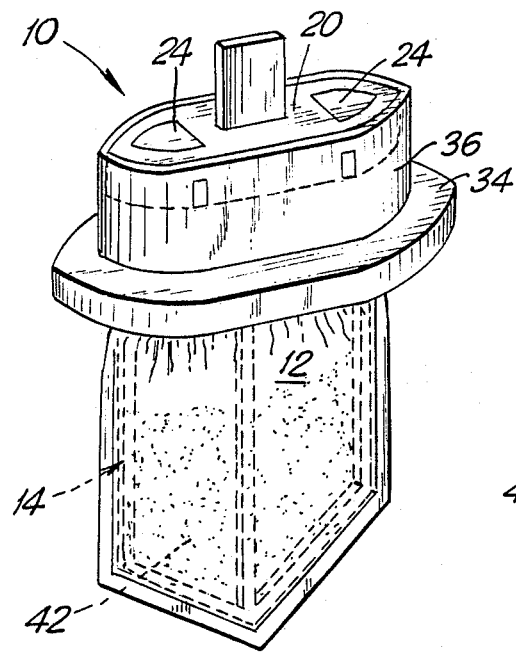
FIG. 4 is an isometric view of an embodiment assembled and shown containing coffee granules.

Now referring to FIG. 4, preferred embodiment 10 of the beverage bag assembly with supporting framework 14, vented cap 20, securing band 36, and flotation ring 34 is illustrated fully assembled and filled with a dry beverage substance 42. Coffee granules (or other dry beverage substance) are poured into bag 12 through vents 25, and then vents 25 are sealed with tabs 24. For the purposes of illustration, the dry beverage substance is described as coffee granules 42. It should be understood that tea leaves, hot chocolate mix, coffee granules mixed with sweetener or creamer, or other beverage substances may be placed in bag 12 and be infused in the manner described herein. After bag 12 is filled through vents 25, vents 25 are covered with removable vent tabs 24 to prevent spillage and retain freshness.

Flotation ring 34 is especially important when device 10 is used in a microwave oven. After tabs 24 have been removed, device 10 is placed in a cup of water, ring 34 floats on the top of the water. Bag 12 with coffee granules 42 is immersed in the water and remains immersed even when the water boils because gas escapes through vents 25, allowing water to move through bag 12 and derive the full flavor from the granules 42.

Figure 5:
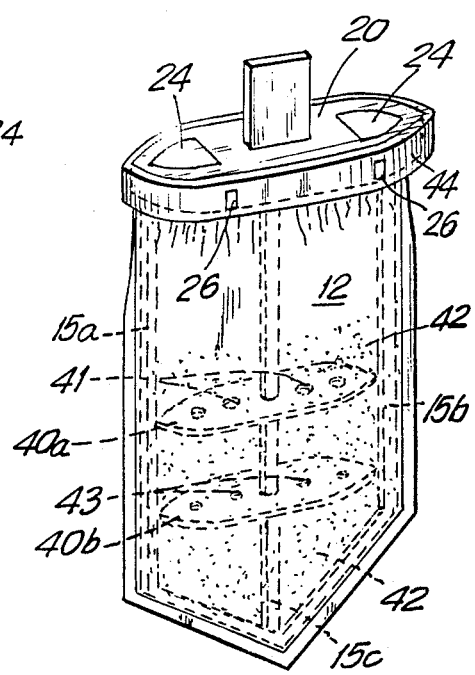
FIG. 5 is an isometric view of an alternative embodiment of the assembly without flotation ring and showing grids in the bag.
Figure 6:
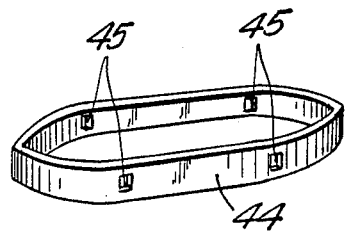
FIG. 6 is an isometric view of the securing band of FIG. 5.

Now referring to FIGS. 5 and 6, an alternative embodiment of securing band 34 is illustrated as band 44. Band 44 does not include a flotation ring and has less height than band 34. Band 44 includes apertures 45 which receive detents 26 of cap 20. When a user does not wish to make cofee in a microwave oven, but would prefer to simply pour boiled water into a cup, band 44 without flotation ring 34 may be conveniently used.

Also seen in FIG. 5 are optional foraminous separation grids 40a and 40b which are supported on uprights 15a, 15b and 15c of framework 14. Grid 40a has apertures 41 through which all but the largest granules 42 fall. Grid 40b has apertures 43 through which the smallest granules 42 fall. Thus, separation grids 40a and 40b assure that granules 42 are spread throughout bag 12 and that the beverage is quickly infused.

Also seen in FIG. 5 are vent tabs 24 on cap 20 which prevent coffee granules 42 from spilling.

Now refering to FIGS. 7, 8, 9 and 10, the figures illustrate the preferred assembly. It has been discovered that when coffee granules are stored directly in the bag (as in FIGS. 1–6), the granules sometimes chemically react with the bag, clinging to the bag and absorbing undesirable flavor qualities from the bag. In order to avoid this, it is preferable to store the granules in an air-tight chamber which does not impart flavor to the granules, as illustrated in FIGS. 7–10. In this embodiment, the beverage substance is retained in a storage chamber until the time of use, thus keeping the beverage substance both fresh and dry. Again, for the sake of clarity, the beverage substance will be described as coffee, but other substances are possible. Also, it should be understood that the two previously described embodiments may be adapted by providing them with storage chambers as described in reference to the following figures.

FIG. 7 shows an exploded view of the preferred assembly. Vented storage chamber 47 is seen with handle 46, handle assembly 55, top 66, and vents 68 in top 66. Uprights 15a, 15b, 15c, and 15d are seen joined to flotation ring 56. Basket 57 is suspended from flotation ring 56 and has slanted wall 48 which terminates at aperture 54. Flotation ring 56 includes detents 49 which are received inside detents 50 of chamber 47. Securing band 52 includes apertures 51 to receive detents 50 on chamber 47. To assemble, flotation ring 56 with basket 57 is slipped inside storage chamber top 47 in the direction shown by arrow 69, detents 49 received inside detents 50. Bag 12 (not shown) is then slipped over uprights 15a, 15b, 15c, and 15d, and all pieces are secured together by last slipping securing band 52 over all and engaging detents 50 in apertures 51. Coffee may then be poured into the storage chamber through vents 68 which are then sealed with tabs. The coffee, or other beverage substance, is now sealed in an airtight, preferably plastic, container. To make a drink, basket 57, suspended from flotation ring 56, must be opened.

FIG. 8 shows the assembly of FIG. 7 in use. Referring now particularly to FIG. 8, beverage bag assembly 60 is shown in the open position, allowing coffee granules 42 to escape into bag 12. Handle assembly 55, rotatably attached to chamber top 66, has been turned, popping up to open aperture 65 in top 66 and aperture 54 in basket 57. Coffee 42 is thus shown descending into bag 12.

Now referring to FIGS. 9 and 10, handle assembly 55 is shown in both open (B) and closed (A) positions. Assembly 55 ends in handle 46 and includes solid stem 63 surrounded by cylinder 61. Cylinder 61 has a helical groove 62 in its interior wall. Handle 46 is attached to the assembly 55 through tab 71 mounted in stem 63. Stem 63 is slidably received in cylinder 61. Knob 64 on stem 63 rides in helical groove 62. In the closed position (A), handle 46 seals aperture 65 and stem 63 seals aperture 54. As handle 46 is turned, knob 64 is drawn upward along groove 62, breaking the seal and exposing aperture 54 to allow coffee granules to fall through aperture 54 to bag 12 (position B).

There are several variations which can be practiced in the scope of this invention. First, the bag and supporting framework are not limited to the ovaloid with pendant bag but may be of any shape convenient for immersion in a coffee mug or cup.

Second, the flotation ring may be positioned at any point on the securing band, or on the vented cap/storage chamber and on their inner or outer perimeters and still be within the scope of this invention.

The separation grids are optional.

The means of covering the vents include any means suitable, such as paper stick-on tabs, hinged tabs formed with the cap, as well as mechanical tabs operated simultaneously with the handle.

The bag material may be paper, woven fabric, or pressed material, and may be heat sealed at the edges or one continuous piece.

Although the elements of this invention may be snap fitted with detents and apertures as illustrated, several or all of the elements may be molded as a single unit. Further, types of securing the members other than snap fit are intended to be included within the scope of this invention.

Although the preformed seals are explained as being broken by the handle assembly, there are several methods that can be used to break the seal and are intended to be included within the scope of the invention.

It is preferred that the assembly include a storage chamber, as shown in FIGS. 7–10, and the assembled bag of FIGS. 1–6 may be individually sealed in a foil or mylar packet to insure freshness, but this latter suggestion is optional.

Also, the vent tabs are shown as flat, preferably self-sticking paper tabs, but mechanical tabs may be provided which may be operated simultaneously with the turning of the handle on the storage chamber top.

It should be appreciated that the beverage bag assembly of this invention is equally suitable for individual cups of beverage or larger quantities.

The bag is shown as overfitting the framework, but it may also underfit the framework and be sealed to the framework top by heat seal, or the like, and both methods are intended to be included in the term "fitting."

There are many advantages to the beverage bag assembly of this invention. Chiefly, it provides a premeasured, portable, disposable container for making a single cup of infused beverage.

While the preferred contemplated use is for hot beverages, the assmembly is equally applicable to cold or room temperature uses. It may be used for coffee, tea, or hot drink mixes of any kind. The gas vents, disposed above the water line by the flotation ring, allow efficient brewing of fresh coffee.

The beverage bag with storage chamber provides for uncontaminated storage of the beverage substance until the time of use, also insuring freshness and easy storage.

The beverage bag assembly of this invention provides for simultaneous heating and brewing of a hot beverage in a microwave oven.

Having now illustrated and described my invention, it is not intended that such description limit this invention, but rather that this invention be limited only by reasonable interpretation of the appended claims.

What is claimed is:

1. A beverage bag assembly comprising:
   (a) a framework including a plurality of upright support members and at least one cross member, each said support member joined proximate one end to an adjacent support member by at least one cross member;
   (b) a water permeable bag including an open top, said bag sized to fit said framework;
   (c) a vented top cap of a size predetermined to span the open top of said bag; and,
   (d) means to secure said bag to either said framework or said cap or both; so that when said bag is filled with a dry beverage substance and secured to said cap or framework, said bag is suspended in water to infuse a drink.

2. The beverage bag assembly according to claim 1 including, additionally, a finger-tip graspable handle on said cap.

3. The beverage bag assembly according to claim 1 including, additionally, a flotation ring attached to said securing means, said flotation ring together with said cap and securing means providing an assembly which floats while said bag remains immersed.

4. The beverage bag according to claim 1 wherein said cap comprises a plurality of vents, at least one of said vents having a preformed removable tab, removal of said tab forming a gas escape vent in said cap.

5. The beverage bag assembly according to claim 1 wherein said means to secure said bag to said framework is a generally ovaloid band, said cap including detent means and said band including apertures to receive said detent means.

6. The beverage bag assembly with supporting framework according to claim 2 including, additionally, a storage chamber attached to said flotation ring and wherein said handle includes an assembly connected thereto to open and shut said storage chamber to be sealed or opened by a turn of said handle.

7. A beverage bag assembly with supporting framework and vented cap, said beverage bag comprising:
   (a) an elongated framework including a plurality of upright support members and at least one cross member, each said support member joined at one end to an adjacent support member by at least one cross member;

(b) an elongated water permeable bag including an open top, said bag sized to overfit said framework;

(c) a vented top cap of a size predetermined to span the open top of said bag, said cap including means to secure said bag to said cap and attachment means to receive and hold said framework's support member's other end;

(d) a generally annular securing band on said cap, said band sized to circumscribe said cap and retain said bag; and (e) an annular flotation ring attached to said band, so that when said bag is filled with a dry beverage substance, vented and secured to said assembly, said bag may be completely immersed in water with said assembly's cap, band and flotation ring floating on top of the water.

8. The beverage bag assembly according to claim 7 including, additionally, a finger-tip graspable handle on said top cap.

9. The beverage bag assembly according to claim 7 wherein said securing band and said flotation ring are unitary.

10. The beverage bag assembly according to claim 7 wherein said means to receive said framework in said cap is a plurality of indents on said cap's underside and wherein said upright members' top ends are snap fittable into said indents.

11. The beverage bag assembly according to claim 7 including, additionally, at least one foraminous separating grid in said bag, said grid separating particles of said dry beverage substance according to size.

12. The beverage bag assembly according to claim 7 including, additionally, a removable preformed tab placed over said vent to prevent escape of said beverage substance.

13. A beverage bag assembly comprising:
(a) a framework including a plurality of upright support members and at least one cross member;
(b) a flotation ring attached to said framework's upright members;
(c) a basket suspended within said flotation ring;
(d) a water permeable bag including an open top, said bag sized to fit said framework;
(e) a storage chamber including a vented top and side walls sized to fit with said flotation ring;
(f) means to join said bag, framework, flotation ring and storage chamber's side walls together; and,
(g) a handle assembly attached to said storage chamber's top, said handle assembly including;
 (i) a handle rotatably attached to said chamber's top;
 (ii) a stem joined to said handle at one stem end and ending at said other stem end in a breakable seal connection to said basket, said stem including an outwardly extending knob;
 (iii) a cylinder surrounding said stem between said chamber's top and said basket, said cylinder's interior wall including a helical groove aligned to accept said knob, so that when said assembly is assembled with a dry beverage substance in said basket and said storage chamber, said dry beverage substance may be released from said basket into said bag by turning said handle, to draw said knob upward in said helical groove, the movement thereof breaking said seals.

14. The beverage bag assembly according to claim 13 wherein said storage chamber top includes at least one vent, said vent covered with a removable tab.

15. The beverage assembly according to claim 14 wherein said tab is mechanically removable with the operation of said handle assembly.

16. A method of producing a beverage bag assembly comprising the steps of:
(a) providing a framework including a plurality of upright support members and at least one cross member;
(b) fitting a water permeable bag with an open top onto said framework;
(c) capping said bag to said framework by fitting a cap having at least one vent over said framework top and said open bag end;
(d) providing a securing band to overfit said cap and framework and hold said assembly together;
(e) providing a flotation ring to hold said bag immersed in water while said cap, band and ring float;
(f) filling said bag with a dry beverage substance;
(g) sealing said cap's vent or vents to prevent spilling of said dry beverage substance; and
(h) sealing said filled beverage assembly in a moistureproof container.

17. The method of producing a beverage bag assembly according to claim 16 further comprising providing a storage chamber for storage of a beverage substance until time of use.

* * * * *